(12) United States Patent
Wynblatt et al.

(10) Patent No.: US 7,765,025 B2
(45) Date of Patent: Jul. 27, 2010

(54) SYSTEMS AND METHODS FOR PROGRAMMING MOTION CONTROL

(75) Inventors: Michael Wynblatt, Moraga, CA (US); Farshid Arman, Lafayette, CA (US); Hartmut Ludwig, West Windsor, NJ (US); Lingyun Wang, Plainsboro, NJ (US)

(73) Assignees: Siemens Aktiengesellschaft, Munich (DE); Siemens Corporation, Iselin, NJ (US)

( * ) Notice: Subject to any disclaimer, the term of this patent is extended or adjusted under 35 U.S.C. 154(b) by 0 days.

(21) Appl. No.: 11/893,166

(22) Filed: Aug. 14, 2007

(65) Prior Publication Data
US 2008/0039971 A1   Feb. 14, 2008

Related U.S. Application Data

(62) Division of application No. 10/845,392, filed on May 12, 2004.

(60) Provisional application No. 60/520,515, filed on Nov. 14, 2003.

(51) Int. Cl.
*G07F 7/00* (2006.01)
(52) U.S. Cl. .................................. 700/228
(58) Field of Classification Search .................. 700/228
See application file for complete search history.

(56) References Cited

U.S. PATENT DOCUMENTS

| | | | |
|---|---|---|---|
| 3,604,551 A | 9/1971 | Fink | |
| 3,617,033 A | 11/1971 | Ichikawa et al. | |
| 3,841,461 A | 10/1974 | Henderson et al. | |
| 3,917,050 A | 11/1975 | Gregor | |
| 4,000,492 A | 12/1976 | Willens | |
| 4,039,074 A | 8/1977 | Maxted | |
| 4,180,943 A | 1/1980 | Smith et al. | |
| 4,398,720 A | 8/1983 | Jones et al. | |
| 4,461,382 A | 7/1984 | Hoover et al. | |
| 4,634,328 A | 1/1987 | Carrell | |
| 4,678,073 A | 7/1987 | Anderson et al. | |
| 4,944,381 A | 7/1990 | Riley | |
| 4,972,131 A | 11/1990 | Kojyo et al. | |
| 5,018,073 A | 5/1991 | Goldberg | |

(Continued)

FOREIGN PATENT DOCUMENTS

DE   31 39 279   4/1983

(Continued)

OTHER PUBLICATIONS

Parcel Manipulation and Dynamics With a Distributed Actuator Array: The Virtual Vehicle Jonathan E. Luntz, William Messner, and Howie Choset, Department of Mechanical Engineering, Carnegie Mellon University Pittsburgh, PA 15213, 7 pages total, jl9f@cmu.edu, bmssner@cmu.edu, choset@cs.cmu.edu.

(Continued)

*Primary Examiner*—Patrick Mackey
*Assistant Examiner*—Michael E. Butler
(74) *Attorney, Agent, or Firm*—Donald B. Paschburg; F.Chau & Associates, LLC (57) ABSTRACT

Systems, methods and computer program code for the programming of motion control in load transportation systems are provided which may include programming motion control by specifying desired load motions.

16 Claims, 6 Drawing Sheets

U.S. PATENT DOCUMENTS

| | | | |
|---|---|---|---|
| 5,147,023 A | 9/1992 | Meindl | |
| 5,165,520 A | 11/1992 | Hervé | |
| 5,222,586 A | 6/1993 | Ydoate et al. | |
| 5,299,693 A | 4/1994 | Ubaldi et al. | |
| 5,372,238 A | 12/1994 | Bonnet | |
| 5,393,937 A | 2/1995 | Etherington et al. | |
| 5,443,791 A | 8/1995 | Cathcart et al. | |
| 5,529,756 A | 6/1996 | Brennan | |
| 5,575,378 A | 11/1996 | Billington et al. | |
| 5,638,938 A | 6/1997 | Lazzarotti et al. | |
| 5,655,667 A | 8/1997 | Isaacs et al. | |
| 5,724,239 A | 3/1998 | Kaneko | |
| 5,769,204 A | 6/1998 | Okada et al. | |
| 5,887,699 A | 3/1999 | Tharpe et al. | |
| 5,923,132 A | 7/1999 | Boyer | |
| 5,963,003 A * | 10/1999 | Boyer | 318/574 |
| 6,002,971 A * | 12/1999 | Lucas | 700/250 |
| 6,015,039 A | 1/2000 | Bonnet et al. | |
| 6,021,888 A | 2/2000 | Itoh et al. | |
| 6,027,694 A | 2/2000 | Boulton et al. | |
| 6,189,677 B1 * | 2/2001 | Ruf et al. | 198/411 |
| 6,240,335 B1 | 5/2001 | Wehrung et al. | |
| 6,246,923 B1 * | 6/2001 | Sugimura et al. | 700/218 |
| 6,250,707 B1 | 6/2001 | Dintner et al. | |
| 6,259,967 B1 | 7/2001 | Hartlep et al. | |
| 6,264,891 B1 | 7/2001 | Heyneker et al. | |
| 6,315,104 B1 | 11/2001 | Ebert | |
| 6,330,483 B1 | 12/2001 | Dailey | |
| 6,393,362 B1 * | 5/2002 | Burns | 701/301 |
| 6,460,683 B1 | 10/2002 | Pfeiffer | |
| 6,473,713 B1 | 10/2002 | McCall et al. | |
| 6,603,630 B1 | 8/2003 | Gong et al. | |
| 6,643,563 B2 * | 11/2003 | Hosek et al. | 700/245 |
| 6,648,125 B1 | 11/2003 | Bershadsky | |
| 6,694,220 B1 * | 2/2004 | Tanz | 700/226 |
| 6,900,608 B2 * | 5/2005 | Kaplan et al. | 318/568.11 |
| 6,910,569 B2 | 6/2005 | Reznik et al. | |
| 6,961,628 B2 | 11/2005 | Yutkowitz | |
| 6,996,592 B2 * | 2/2006 | Ikai | 708/300 |
| 7,036,653 B2 | 5/2006 | Reznik et al. | |
| 7,130,716 B2 | 10/2006 | Rogers et al. | |
| 7,184,121 B2 | 2/2007 | Van Der Meulen et al. | |
| 7,292,001 B2 * | 11/2007 | Sato et al. | 318/623 |
| 2002/0005333 A1 | 1/2002 | Mondie et al. | |
| 2002/0156541 A1 * | 10/2002 | Yutkowitz | 700/28 |
| 2003/0029240 A1 * | 2/2003 | Kozaki | 73/579 |
| 2003/0141165 A1 | 7/2003 | Reznik et al. | |
| 2004/0073331 A1 * | 4/2004 | Chang et al. | 700/223 |
| 2005/0065633 A1 | 3/2005 | Wynblatt et al. | |
| 2005/0107911 A1 | 5/2005 | Wynblatt et al. | |

FOREIGN PATENT DOCUMENTS

| | | |
|---|---|---|
| DE | 32 41 145 | 5/1984 |
| DE | 195 12 575 | 10/1996 |
| EP | 0 463 878 | 1/1992 |
| EP | 0673138 | 9/1995 |
| GB | 1 465 430 | 2/1977 |
| GB | 2 259 900 | 3/1993 |
| GB | 2 312 592 | 10/1997 |
| JP | 2003200759 A | 7/2003 |
| WO | WO 98/17048 A1 | 4/1998 |
| WO | WO 00/76887 A1 | 12/2000 |
| WO | WO 2005/050334 A1 | 6/2005 |

OTHER PUBLICATIONS

The Coulomb Pump: a Novel Parts Feeding Method Using a Horizontally-Vibrating Surface, Dan Reznik, John Canny, EECS Dept. UC-Berkeley, CA 94720-1776 USA, 6 pages total.

U.S. Appl. No. 11/893,348, Wynblatt, et al.

U.S. Appl. No. 11/894,018, Wynblatt, et al.

* cited by examiner

SYSTEMS AND METHODS FOR PROGRAMMING MOTION CONTROL

CROSS-REFERENCE TO RELATED APPLICATIONS

This application claims benefit and priority as a divisional of commonly owned U.S. application Ser. No. 10/845,392 filed May 12, 2004, which claims priotity under 35 U.S.C. §119(e) to commonly-owned U.S. Provisional Patent Application Ser. No. 60/520,515 entitled "A System for Programming Motion Control by Specifying Load Motions", filed in the name of Wynblatt et al. on Nov. 14, 2003, the contents of which are hereby incorporated by reference in their entirety for all purposes.

BACKGROUND

The present disclosure relates generally to the programming of motion control and, more particularly, to programming motion control by specifying desired load motions. Load transportation systems such as those used in warehouses, package distribution plants, assembly plants, and manufacturing plants are often utilized to move loads from one location to another. These loads are often moved using load motion actuators such as conveyor belts, rollers, robotic arms, or pin-hole air jets. Current load transportation systems typically must be programmed to cause a load to undertake a desired behavior.

Figure 1A:
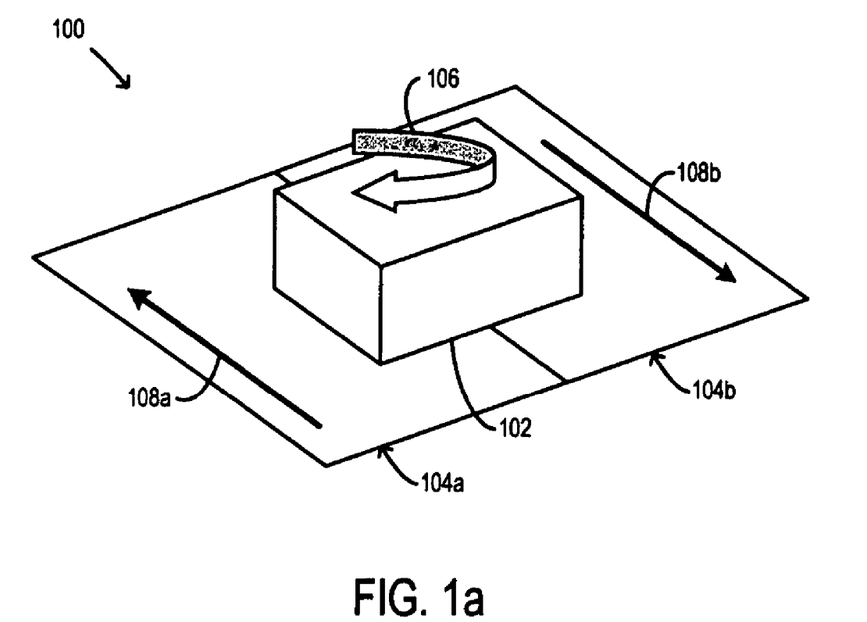
FIG. 1a is a block diagram of a system for transporting loads.

Referring to the load transportation system 100 in FIG. 1a, for example, a load 102 may be moveable by load actuators 104a-b. As shown in FIG. 1a, the load actuators 104a-b may include a left conveyor belt 104a and a right conveyor belt 104b. If the load 102 must be rotated (e.g., as indicated by the rotational arrow 106), the speeds and directions (e.g., represented by the motion vectors 108a-b) of the conveyor belts 104a-b must typically be directly specified. For example, the left conveyor belt 104a may be programmed to move in accordance with a reverse motion vector 108a, while the right conveyor belt 104b may be programmed to move in accordance with a forward motion vector 108b. The speeds of the conveyor belts 104a-b may be specified, for example, to control the rate at which the load 102 is rotated. Similarly, the timing of actuator commands may need to be specified in order to cause the load 102 to undergo a desired behavior or set of behaviors (e.g., rotate ninety degrees, then stop). The system programmer must therefore determine and code each speed, direction, and all timing information for each actuator 104a-b needed to rotate the load 102.

Figure 1B:
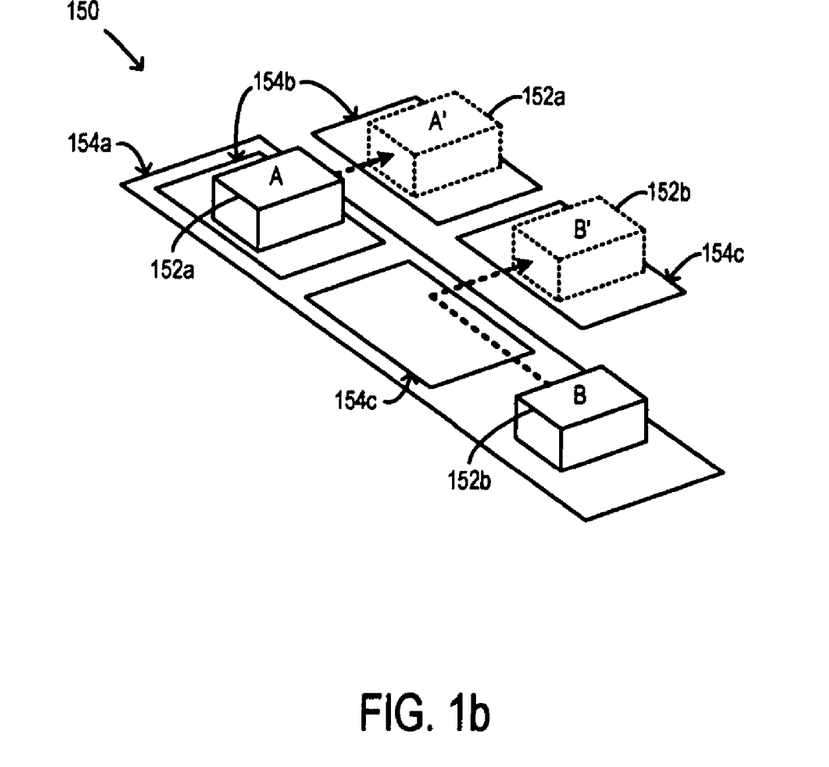
FIG. 1b is a block diagram of a system for transporting loads.

Similarly, with reference to the system 150 of FIG. 1b, load A 152a and load B 152b may be moveable by an actuator 154a that moves all loads rigidly, as well as actuators 154b-c which move only loads that sit on top of the them. The system 150 may be, for example, a crossbelt conveyor system. If loads A 152a and B 152b must be moved from first locations (locations A and B, respectively) to second locations (locations A' and B', respectively), a programmer would have to specify the speeds and directions of the actuators 154a-c, including the times at which each of the specified motion vectors must be initiated and/or stopped.

These speed, direction, and timing decisions require the programmer to be highly skilled in selecting settings for all of the various actuators in a given load transportation system, and require many programming hours to configure the system to properly transport a given load. Where multiple loads are transported by the same system, the required speeds, directions, and timing of the actuators become increasingly complex for the programmer to determine, and require substantially more programming hours to configure.

Accordingly, there is a need for systems and methods for programming motion control that address these and other problems found in existing technologies.

SUMMARY

Methods, systems, and computer program code are therefore presented for programming motion control in load transportation systems.

According to some embodiments, systems, methods, and computer code are operable to receive a command associated with a desired behavior of one or more loads, select a control signal for application to one or more load actuators, the control signal selected to cause the one, or more loads to undertake the desired behavior, and apply the control signal to the one or more load actuators.

According to some embodiments, systems, methods, and computer code are operable to determine a desired velocity of one or more loads, convert the desired velocity to an obtainable velocity, determine a velocity profile to be associated with the one or more loads, and modify the obtainable velocity to substantially conform to the velocity profile.

With these and other advantages and features of embodiments that will become hereinafter apparent, embodiments may be more clearly understood by reference to the following detailed description, the appended claims and the drawings attached herein.

DETAILED DESCRIPTION

Some embodiments described herein are associated with an "actuator", "load actuator", or "load motion actuator". As used herein, the terms "actuator", "load actuator", and "load motion actuator" may be used interchangeably and may generally refer to any devices and/or systems capable of causing, directing, controlling, and/or otherwise contributing to the movement of an object. Examples of load motion actuators may include, but are not limited to, rollers, conveyor belts, pin-hole air jets, motors, servos, cables, valves, magnets, and various robotic devices such as arms, gates, cranes, and hydraulic lifts. In some embodiments, an actuator may be or include an electronic device or component such as a processor, a Printed Circuit Board (PCB), and/or any other type of electrical connection and/or circuit associated with the movement of an object.

Some embodiments described herein are associated with a "control signal". As used herein, the term "control signal" may generally refer to any data, bit, packet, pulse, tone, waveform, and/or other type or configuration of signal. Control signals may be or include information packets transmitted, for example, in accordance with Power-Line Control (PLC), field bus, or industrial Ethernet transmission standards. In some embodiments, a control signal may be or include a command and/or other information associated with a desired setting, action, and/or behavior of one or more load actuators. The control signal may cause, for example, an actuator to move a load in accordance with a desired load behavior.

Figure 2:
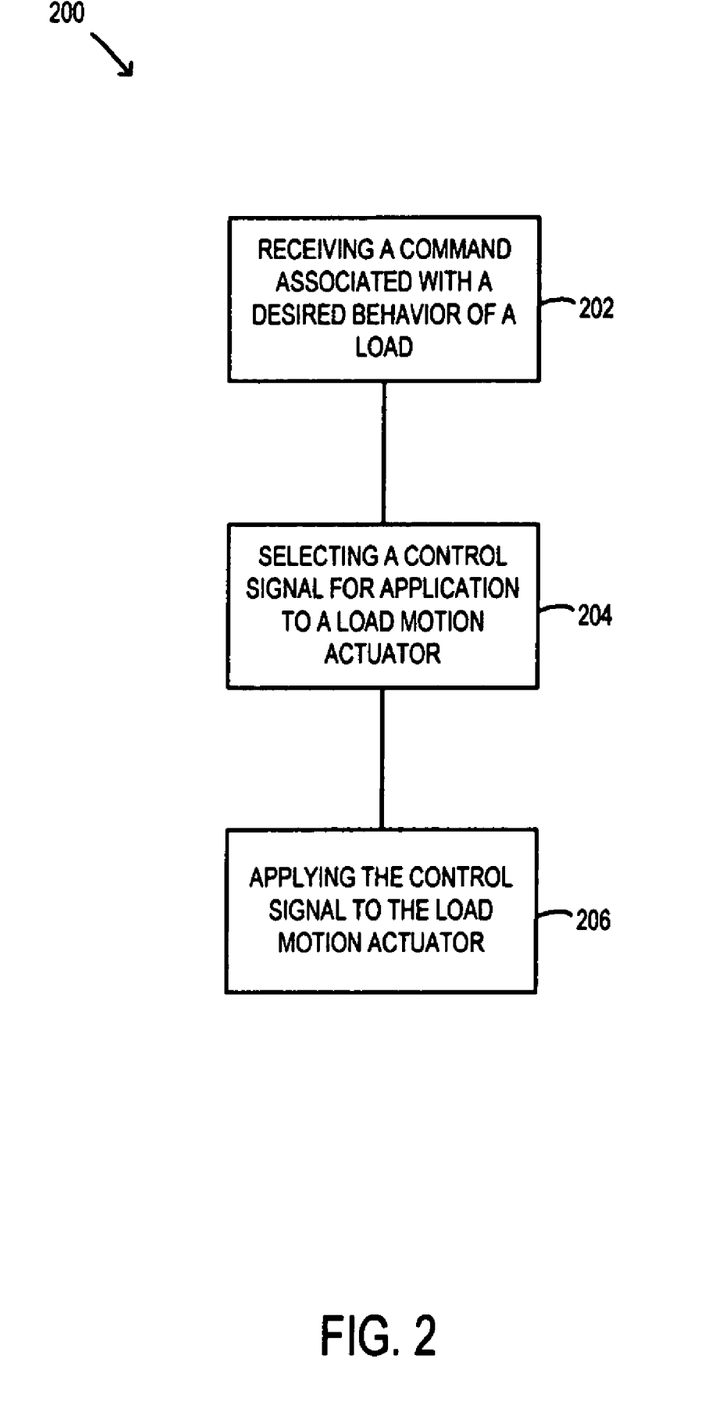
FIG. 2 is a flowchart of a method according to some embodiments.

Referring to FIG. 2 (and with continuing reference to FIG. 1a and FIG. 1b), a flow diagram of a method 200 for programming motion control in accordance with some embodiments is shown. The method 200 may be associated with and/or performed by, for example, the systems 100, 150, 300, and/or 600 (or one or more of the system components) described in conjunction with FIG. 1a, FIG. 1b, FIG. 3, and FIG. 6, respectfully herein. The flow diagrams described herein do not necessarily imply a fixed order to the actions, and embodiments may be performed in any order that is practicable. Note that any of the methods described herein may be performed by hardware, software (including microcode), firmware, or any combination thereof. For example, a storage medium may store thereon instructions that when executed by a machine result in performance according to any of the embodiments described herein.

In some embodiments (such as shown in FIG. 2), the method 200 may begin by receiving a command associated with a desired behavior of a load, at 202. For example, a programmer and/or other entity may enter information indicative of a desired load motion into a computer, Graphical User Interface (GUI), and/or any other type or configuration of interface device. The interface may be, for example, an Application Programming Interface (API) used to facilitate and/or standardize the programming of motion control. In some embodiments, a programmer may enter information associated with a desired rotation 106 of a load 102 (as shown in FIG. 1a). For example, the programmer may use a programming interface to indicate that the load should be rotated ninety degrees clockwise. Similarly, the programmer may also or alternatively specify that load A 152a and load B 152b are to be moved from positions A and B, respectively, to positions A' and B', respectively (as shown in FIG. 1b). In some embodiments, a programmer or other user may issue a command relating to both the translational (e.g., movement of loads A 152a and B 152b to positions A' and B') and rotational (e.g., desired rotation 106) movement of loads. According to some embodiments, commands associated with desired behaviors of multiple loads and/or collections of loads may be received.

For example, a programmer and/or other user may utilize an API to manipulate and/or manage multiple loads. In some embodiments, one or more loads may be associated, for example, by grouping them into virtual collections (e.g., electronically indicating that the loads are associated). Similarly, multiple loads may be partitioned into one or more groups and/or categories (e.g., loads that are located in the same geometric area and/or loads that are of similar types may be associated). Other API functions may, according to some embodiments, also or alternatively be available to the programmer and/or user. For example, the programmer and/or user may submit a query to determine various characteristics associated with one or more loads. In some embodiments, the programmer may, for example, determine and/or request a predicted future position of one or more loads. The programmer may, according to some embodiments, determine the nearest neighboring load of one or more selected loads, collections, and/or groups. In some embodiments, the programmer may, for example, determine the distance between two or more loads (e.g., to determine a likelihood of collision, to try and keep similar loads together, etc.).

In some embodiments, the command may be received from a computer, a computer program, a software module, and/or any other type or configuration of code, device, and/or object. For example, the command may be received from and/or by a computer server, a computer workstation, or a Personal Computer (PC) connected to a network. The network may be, according to some embodiments, any known or available wired or wireless communication network including, but not limited to, a Local-Area Network (LAN), a Wide-Area Network (WAN), a PLC network or field bus network, the Internet, and/or an intranet or extranet. In some embodiments, the command may be received by a processor, an actuator (such as actuators 104a-b, 154a-c), and/or any other network-enabled and/or communication-enabled device. For example, a computer and/or load transportation system programmer may utilize a computer workstation to send a command to a software package and/or API for programming motion control. In some embodiments, the command may be sent, transmitted, and/or received by and/or within a single device, system, and/or object.

The method 200 may continue, for example, at 204 where a control signal for application to a load actuator may be selected. The control signal may be selected, according to some embodiments, to cause a load to undertake the desired behavior associated with the received command. For example, where the programmer specifies, requests, commands, and/or otherwise indicates that the load is to be rotated ninety degrees clockwise, one or more control signals operable to cause the load to move in such a manner may be selected and/or otherwise determined. In some embodiments, the control signal may be selected based only in part on the received command. For example, other factors, commands, metrics, parameters, and/or other information may be utilized in selecting a control signal.

In some embodiments, the control signal may be automatically determined, selected, and/or created. With reference to FIG. 1a, for example, the motion vectors 108a-b and/or the timing of actuator movements may be automatically determined. The motion and timing parameters may then, for example, be automatically converted to and/or encoded in an appropriate control signal. In some embodiments, a computer, processor, and/or software package may determine speeds, directions, and/or timing required to make the load undergo the desired behavior (e.g., as indicated by the received command). In such a manner, for example, the programmer need not directly specify, code, and/or determine the necessary speed, direction, and/or timing parameters. The amount of time the programmer must spend developing custom logic for any given load transportation system may accordingly be significantly reduced.

In some embodiments, the required speeds, directions, and/or timing may be embedded in, converted to, and/or otherwise may be associated with one or more specific control signals. For example, an electronic signal capable of causing an actuator to perform in accordance with the required parameters may be created, selected, identified, and/or otherwise determined. In some embodiments, one or more appropriate control signals may be retrieved from a database or lookup table of known or available control signals. The control signal may be any type or configuration of signal, transmission, and/or communication that is or becomes known or available and/or is described herein. In some embodiments, the control signal may be encoded, encrypted, and/or compressed.

In some embodiments, such as where a programmer specifies that loads A 152*a* and B 152*b* are to be moved from locations A and B to locations A' and B' (as shown in FIG. 1*b*), there may be many methods that the loads may be appropriately transported to the desired locations. While each method may achieve the desired result, each method may require different speed, direction, and timing settings for the different actuators 154*a-c*. In some embodiments, the programmer may only need to specify that the loads 152*a-b* need to be moved to locations A' and B'. The particular method and corresponding actuator settings required to achieve the desired results may be automatically determined. In some embodiments, a method may be automatically chosen from a plurality of available methods, strategies, and/or routes. For example, a programmer may command that load A 152*a* be moved to position A', as described above. Of the many possible methods available to move the load to position A', the most desirable route may be automatically chosen. The various actuator settings required to implement the chosen method may also be determined automatically. In some embodiments, a control signal may then be created, selected, and/or otherwise determined that represents, is indicative of, and/or includes the automatically determined actuator settings.

According to some embodiments, at 206, the control signal may be applied to the load motion actuator. For example, the control signal selected at 204 may be sent to the actuator. In some embodiments, the control signal may cause the actuator to move and/or assist in moving the load in accordance with the desired behavior. In some embodiments, the control signal may be applied to the actuator through the use of one or more converters, filters, and/or controllers. For example, the control signal may be a digital signal sent to an Analog-to-Digital Converter (ADC). The ADC may then, for example, convert the digital control signal to one or more analog commands and/or settings recognized by the actuator.

In some embodiments, the control signal may be applied to the actuator via multiple component and/or composite signals. For example, where the control signal is directed to moving load B 152*b* from location B to location B' (as shown in FIG. 1*b*), an initial signal may be selected and/or transmitted, for example, causing the first actuator 154*a* to move load B 152*b* to the second actuator 154*c*. Once load B 152*b* is positioned on or partially on the second actuator 154*c*, a second signal may be transmitted causing the second actuator 154*c* to move load B 152*b* to the desired destination B'. The selection and/or transmittal of actuator-specific signals may continue, for example, until load B 152*b* reaches another and/or final destination (not shown). In some embodiments, the various control signals and/or signal components may be applied to an actuator prior to the load arriving at the actuator. In some embodiments, the actuator (such as actuator 154*c*) may be controlled as a load nears the actuator. In some embodiments, the various components of the selected control signal (and/or various selected control signals) may be applied directly to one or more actuators as required to appropriately move the load.

Figure 3:
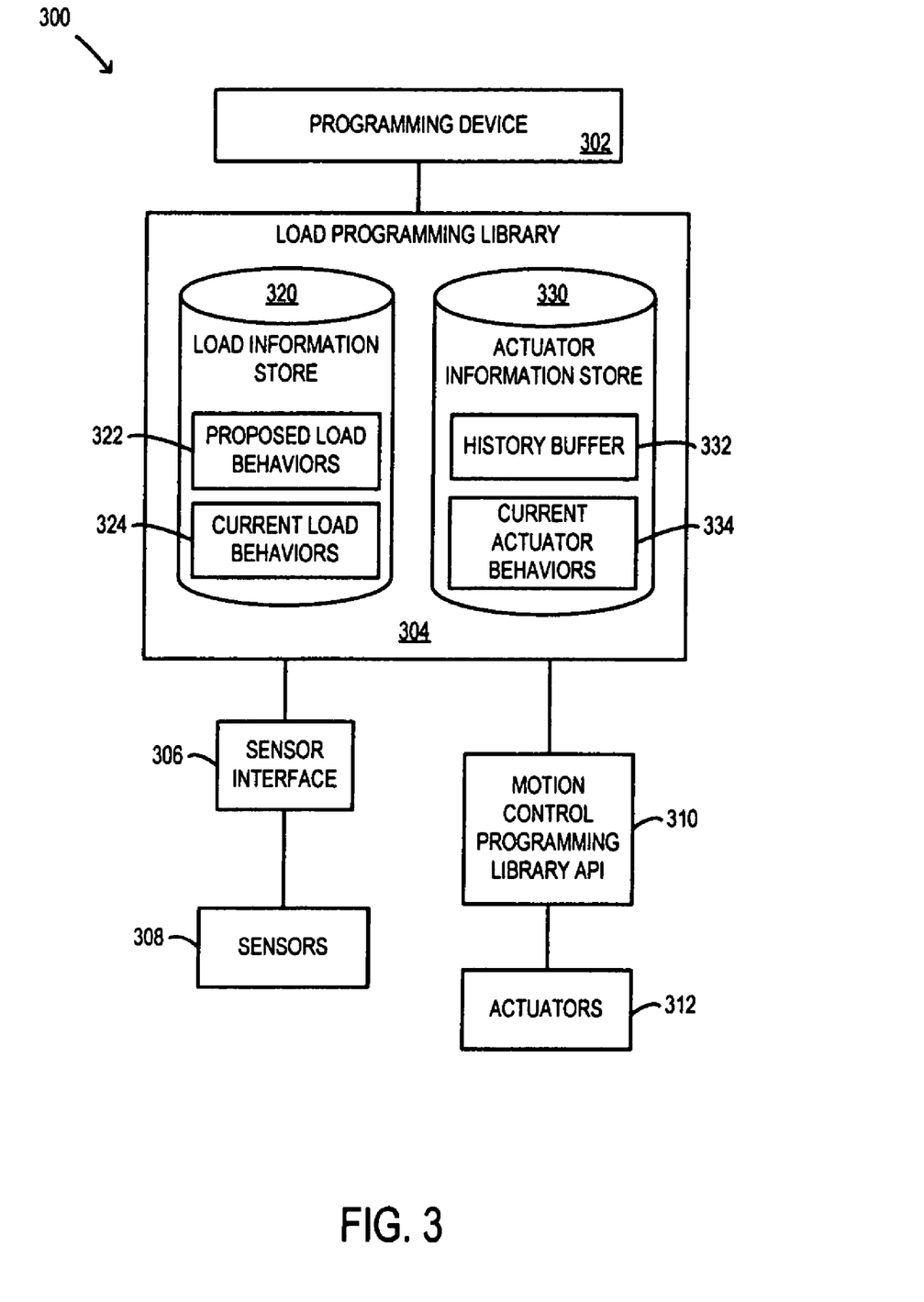
FIG. 3 is a block diagram of a system according to some embodiments.

Turning now to FIG. 3, a block diagram of a system 300 for programming motion control according to some embodiments is shown. The system may be associated with and/or carry out, for example, methods 200 and/or 400 as described herein. The system 300 may include a programming device 302, a load programming library 304, a sensor interface 306, sensors 308, a motion control programming library 310, and actuators 312. In some embodiments, the actuators 312 may be, include, and/or be similar to the actuators 104*a-b*, 154*a-c* described in conjunction with FIG. 1*a* and FIG. 1*b* herein.

Fewer or more components than shown in FIG. 3, and different types, layouts, quantities, and configurations of systems may be used without deviating from the scope and/or purpose of some embodiments.

In some embodiments, the programming device 302 may be or include a PC, a computer workstation, a computer server, a GUI, an API, and/or any other device that is or becomes known or available. For example, the programming device 302 may be a computer workstation and/or console used by a load motion programmer or load transportation system operator. In some embodiments, the programming device 302 may be or include a motion control programming environment such as Microsoft® Visual Studio® or Siemens™ Simatic™ STEP7, for example. The programming device 302 may be used, according to some embodiments, to allow a programmer to specify motion control commands. The programming device 302 may interface with, be connected to, include, and/or otherwise be in communication with the load programming library 304.

In some embodiments, the load programming library 304 may be or include a software package or program installed, for example, on a computer server and/or on or within the programming device 302. The load programming library 304 may, according to some embodiments, carry out, effectuate, and/or otherwise be associated with methods 200 and/or 400 as described herein. For example, the load programming library 304 may convert a programmer's load motion command into actuator commands. The actuator commands may, for example, be operable to move a load in accordance with the specified load motion command. In some embodiments, the load programming library 304 may include and/or provide access to an API for programming load motion (not shown).

In some embodiments, the load programming library 304 may include a load motion store 320. The load motion store 320 may be any type and/or configuration of storage device that is or becomes known or available. For example, the load motion store 320 may be or include one or more databases, tables, files, and/or memory devices for storing information. In some embodiments, the load motion store 320 may include storage for proposed load behaviors 322 and/or current load behaviors 324. The proposed load behaviors 322 may include, for example, desired load motions specified by a load motion programmer. In some embodiments, the proposed load behaviors 322 may be or include and/or otherwise be associated with a command received from and/or through the programming device 302.

The current load behaviors 324 may be or include information associated with the current position, behavior, and/or relating to a characteristic of a load. In some embodiments for example, current information regarding a load may be obtained from the sensor interface 306 and/or the sensors 308. The load motion store 320 may, according to some embodiments, also or alternatively store information associated with future and/or predicted positions, characteristics, and/or qualities related to one or more loads. In some embodiments, the load motion store 320 and/or the load programming library 304 may also or alternatively store other information associated with a load transportation system, such as the size and/or boundaries of the system and default or normal paths and/or plans for moving loads. In some embodiments, a programmer may utilize the programming device 302, for example, to query the information contained within the load information store 320. For example, the programmer may enter a query command such as "GetVelocity", which may for example, request the current load behavior 324 (e.g., the velocity) of a particular load.

The load programming library 304 may, according to some embodiments, include an actuator information store 330. The actuator information store 330 may, for example, contain information associated with each actuator in a load transportation system. Examples of actuator information may include, but are not limited to, the numbers, sizes, characteristics, and/or positions of actuator areas of influence, default values for actuator settings, and speed and/or directional capabilities of actuators. In some embodiments, the information stored within the actuator information store 330 may be used by the load programming library 304 to convert desired load motions into appropriate actuator commands.

In some embodiments, the actuator information store 330 may include a history buffer 332 and/or may store information associated with current actuator behaviors 334. The history buffer 332 may store, for example, information associated with the past positions, behaviors, and/or characteristics relating to actuators. The current actuator behaviors 334 may be or include the present, future and/or predicted actuator commands and/or settings. In some embodiments, the actuator information store 330 and/or the load programming library 304 may also or alternatively store other information associated with a load transportation system, such as the size and/or boundaries of the system and default or normal paths and/or plans for moving loads.

The sensor interface 306 may generally be any device and/or component for communicating with sensors that is or becomes known or available. In some embodiments for example, the sensor interface 306 may be or include a computer and/or computer processor, a network processor, a Network Interface Card (NIC), and/or a converter, filter, or other logic and/or computational device. The sensors 308 may be any devices and/or components that are operable to gather, sense, and/or otherwise determine information associated with loads and/or load movements or behaviors. The sensors 308 may include, for example, motion sensors, weight sensors, light sensors (including lasers), thermal sensors, acoustic sensors, triggers, gates, switches, and/or barcode or other electronic readers and/or scanners.

In some embodiments, the motion control programming library 310 may be or include a system or device capable of managing, creating, issuing, sending, and/or receiving actuator commands. The motion control programming library 310 may include, according to some embodiments, an API (not shown) for defining, programming, and/or managing motion control functions or commands. The motion control programming library 310 may be or include, for example, a Siemens™ SIMOTION® motion control system. In some embodiments, the API provided by the motion control programming library 310 may be operated in accordance with the IEC-61131 standards published by the International Electrotechnical Commission (IEC) and/or as defined by PLCopen. The motion control programming library 310 may, according to some embodiments, implement or apply actuator commands to the actuators 312. For example, the motion control programming library 310 may cause the actuators 312 to behave in accordance with one or more actuator commands determined by the load programming library 304.

As an illustrative example, a programmer may require a load to be moved from one location to another (such as from location A to location B, as shown in FIG. 1b). The programmer may utilize the programming device 302, which may be, for example, a computer workstation. The computer workstation 302 may include an installed software program that includes the API provided by the load programming library 304. Through the load programming API, the programmer may enter and/or code various commands relating to the transportation of the load. For example, the programmer may enter a command such as "SetPosition" to identify the desired position of the load (e.g., location B).

The desired load behavior (e.g., movement from location A to location B) may, for example, be stored by the load programming library 304 as a proposed load behavior 322 in the load information store 320. For example, the desired behavior may be stored in a proposed load behavior section and/or table 322 of a load database 320. In some embodiments, the load programming library 304 may communicate with the sensor interface 306 (and/or sensors 308) to determine a current status of the load. According to some embodiments, the sensors 308 may provide information to the load programming library 304 (e.g., via the sensor interface 306) on a continuous or intermittent basis.

The current load information may be stored by the load programming library 304 as a current load behavior 324 in the load information store 320. In some embodiments, when the proposed load behaviors 322 do not match the current load behaviors 324, the load programming library 304 may initiate and/or transmit commands to move the load in accordance with the desired load behaviors 322. In other words, the load programming library 304 may determine that the load needs to move and may trigger an event and/or initiate a process to move the load as required. In some embodiments, the current load behaviors 324 and the proposed load behaviors 322 may not be compared and/or related until a particular commit command, such as a "Go" command, is received from the programmer.

Figure 4:
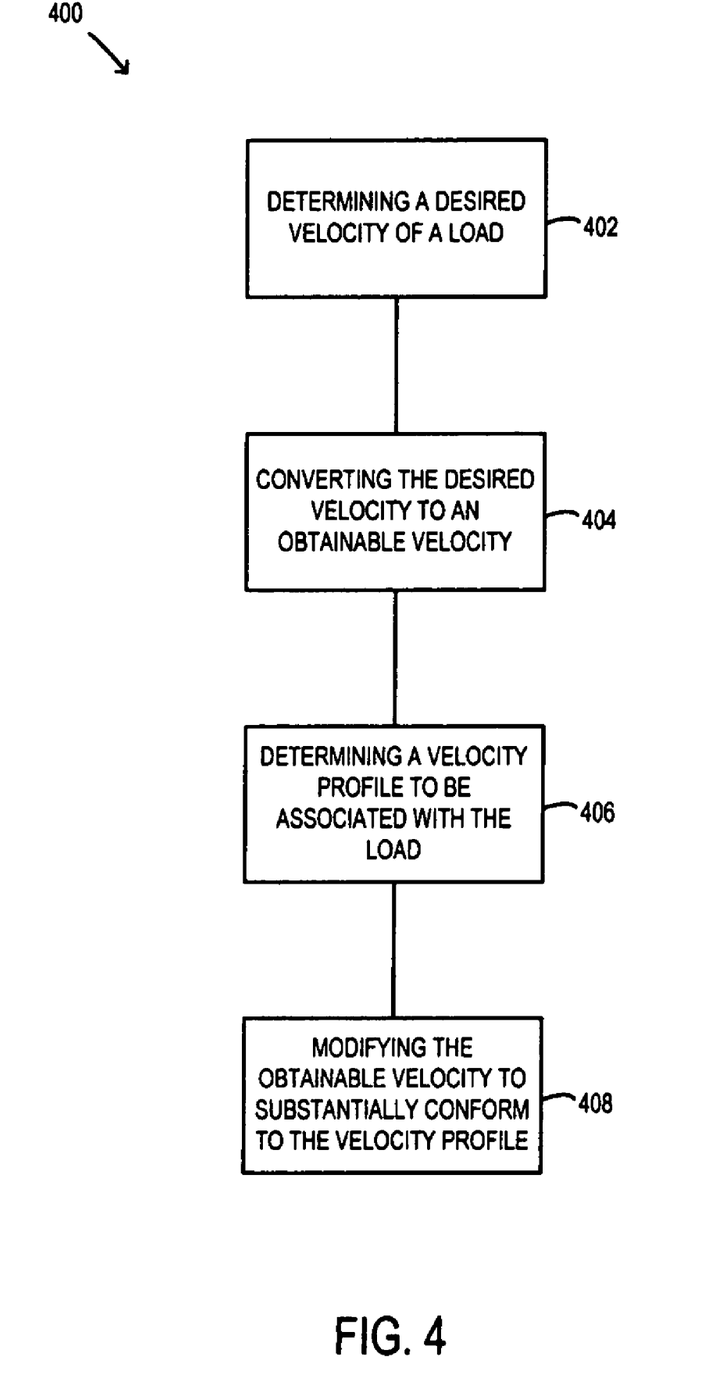
FIG. 4 is a flowchart of a method according to some embodiments.

Continuing the illustrative example, once the load programming library 304 has determined that the load must be moved, the desired velocity of the load may be determined. In some embodiments, the programmer may enter and/or set the desired velocity. Where a simple "SetPosition" command is entered however, an appropriate velocity for the load may need to be determined. The velocity may be determined, for example, in accordance with the method 400 as described hereinafter. In some embodiments, once the intended velocity of the load is determined and/or set, the desired load behavior (movement direction, velocity, etc.) may be converted and/or mapped to appropriate actuator commands. An example of how the desired load behaviors may be mapped to actuator commands is described in the co-pending U.S. patent application Ser. No. 10/886,897, titled "Systems and Methods for Controlling Load Motion Actuators", concurrently filed in the name of Wynblatt et al. on Jul. 7, 2004, the contents of which are hereby incorporated by reference in their entirety for all purposes.

In some embodiments, information from the actuator information store 330 may be utilized to determine commands that are directed to operating the actuators 312 in accordance with various limits, capabilities, and/or characteristics of the actuators 312. Similarly, stored and/or entered information regarding the load transportation system, such as default load paths or speeds, may be utilized to determine and/or modify actuator commands. For example, the desired load behaviors and/or velocities determined, processed, and/or received from the load programming library 304 may be converted to one or more actuator commands, such as commands defined by the API provided by the motion control programming library 310.

In some embodiments, the commands defined by the motion control programming library 310 (and/or an associated API) may be the commands that typically must be determined by a load motion programmer to operate current load transportation systems. According to some embodiments herein, the load programming library 304 may allow the programmer to simply enter desired load motions, which the load programming library 304 may then, for example, convert to appropriate actuator commands recognized and/or defined by the motion control programming library 310.

In some embodiments, the actuator commands determined, defined, and/or mapped from desired load motions may then be applied to the actuators 312. For example, the motion control programming library 310 may transmit the determined actuator commands directly to the actuators 312. In some embodiments, a separate motion control device (not shown) may receive actuator commands and/or other signals (such as the control signal described in conjunction with method 200 herein). The motion control device may then, for example, cause the actuators 312 to move in accordance with the determined actuator commands.

Turning now to FIG. 4, a flowchart of a method 400 for programming motion control in accordance with some embodiments is shown. The method 400 may be performed by and/or associated with, for example, the system 300 described in conjunction with FIG. 3 above. In some embodiments, the method 400 may be carried out by the load programming library 304 of system 300. The method 400 may begin, according to some embodiments, by determining a desired velocity of a load, at 402.

For example, a programmer may enter a command, such as "SetVelocity", specifying a desired velocity for a load. If no specific velocity is specified by the programmer (such as when the programmer enters a "SetPosition" command), a normal or default plan for moving loads may be determined. For example, default load movement information, such as preferred load paths, may be stored in a database (such as load information store 320) or in a file and/or computer program (such as in or by the load programming library 304). The velocity for the load may then be determined based on the default movement plan, in accordance with a default velocity setting, and/or within limits stored regarding system and/or actuator capabilities.

In some embodiments, the method 400 may continue at 404, by converting the desired load velocity into an obtainable load velocity. For example, various stored and/or entered information regarding the capabilities of the system and/or the actuators may be utilized to determine if the desired velocity is capable of being implemented by the given load transportation system. If the desired velocity is obtainable, then no change to the desired velocity may be necessary, for the desired velocity may already be an obtainable velocity. If the desired velocity is not obtainable, the desired velocity may need to be adjusted to an obtainable velocity. In some embodiments, an obtainable velocity substantially similar to the desired velocity may be selected and/or determined. For example, the desired velocity may be converted to the closest obtainable velocity (e.g., the obtainable velocity having the smallest deviation from the desired velocity).

The method 400 may continue, according to some embodiments, at 406, by determining a velocity profile to be associated with the load. For example, the obtainable velocity may need to be smoothed to avoid undue and/or inappropriate acceleration of the load. Information may be stored and/or entered, for example, regarding the limits within which a load may be accelerated, rotated, and/or moved. Fragile and/or eccentric loads may require smooth acceleration to avoid damage and/or tipping, for example. In some embodiments, a velocity profile (i.e., an acceleration plan) may be selected which conforms to the limits established for the load. For example, an expected change in velocity (i.e., acceleration) may be determined by comparing the current velocity of the load (such as may be stored in the current load behaviors 324 of the load information store 320) to the obtainable velocity of the load (such as may be stored in the proposed load behaviors 322 of the load information store 320).

At 408, the obtainable velocity may be modified to substantially conform to the determined velocity profile. Where the difference between the obtainable load velocity and the current load velocity exceeds certain values, for example, the obtainable load velocity may be modified so that the load is accelerated within acceptable limits. In some embodiments, the obtainable load velocity may be changed to match the maximum, average, median, and/or minimum velocity that is acceptable according to the selected velocity profile. In some embodiments, the change in load velocity from the current load velocity to the obtainable load velocity may be spread out over an appropriate length of time to achieve the desired acceleration.

In some embodiments, the velocity of the load may be further adjusted. For example, the path of the load (route, velocity, timing, etc.) may be analyzed to determine if the load is likely to collide with other loads. Proposed paths for various loads may be compared at specific, various, and/or random time intervals, for example, to determine if any loads will occupy the same location at the same time (i.e., a collision). Information regarding the loads, such as load size and/or shape, may be utilized to assist in determining if loads will collide. In some embodiments, if a collision between two loads is predicted, one or more of the velocities and/or paths of the two competing loads may be altered to avoid the collision.

For example, the modified obtainable velocity of the load with the lowest priority may be adjusted to avoid the collision. In some embodiments, the proposed velocities of either or both loads may be iteratively reduced, for example, until no collision appears likely. The method 400, and/or any of the velocity determinations, conversions, alterations, and/or modifications therein, may be repeated at various time intervals, continuously, and/or after changes are made to avoid a predicted collision. Changes made to avoid a collision may, for example, create the possibility of new collisions which may need to be investigated.

Figure 5:
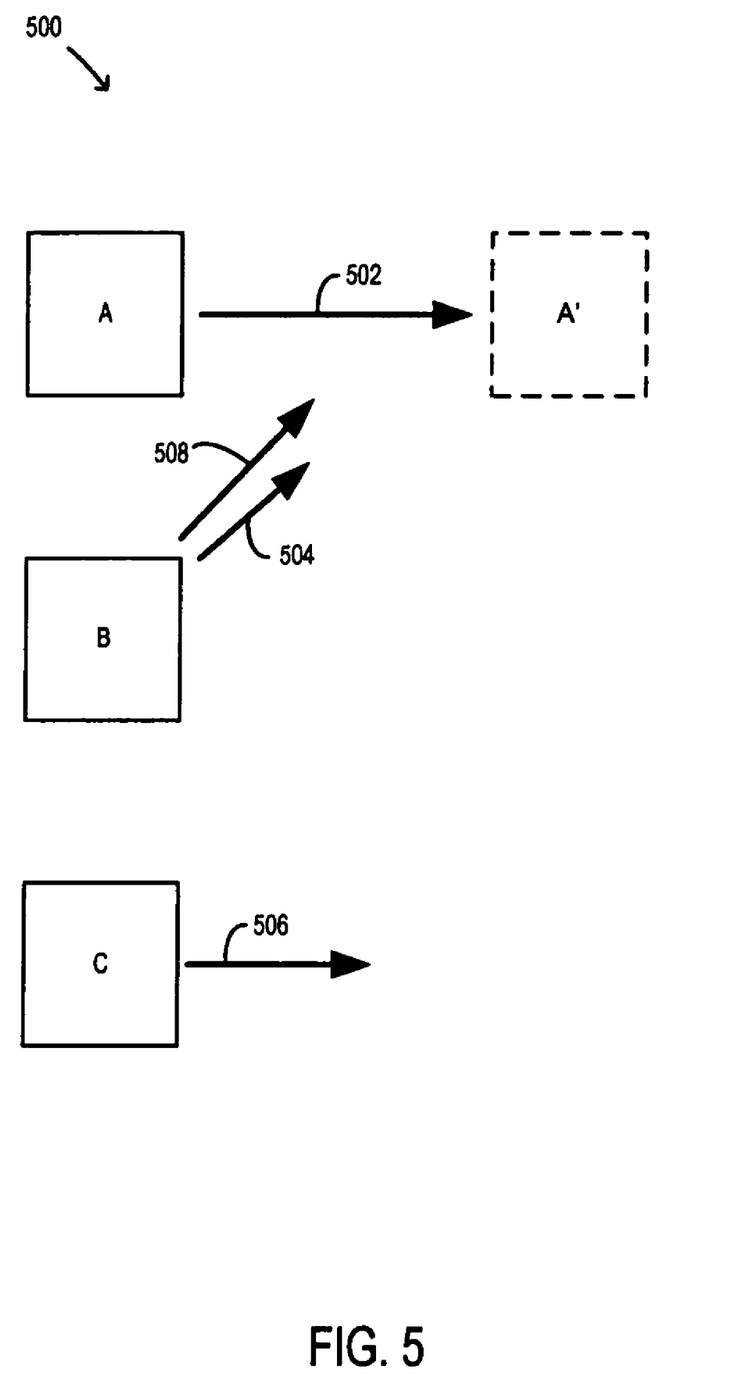
FIG. 5 is a block diagram of a system according to some embodiments.

Referring now to FIG. 5, a system 500 is shown to illustrate the programming of load motion according to some embodiments. The system 500 may, for example, implement and/or be associated with methods 200 and/or 400 as described above. In some embodiments, the system 500 may include loads A, B, and C. Load A may be moved to position A', according to some embodiments, in accordance with a desired motion vector 502. In some embodiments, loads B and C may be moved in accordance with desired motion vectors 504 and 506, respectively. The desired motion vectors 502, 504, 506 may, according to some embodiments, be specified motion vectors, obtainable motion vectors, modified obtainable motion vectors, and/or other motion vectors associated with the respective loads.

As an illustrative example, a programmer may specify that load A is to be moved to position A', load B is to be moved at an heading of forty degrees at a velocity of one and a half meters per second (vector 504), and load C is to be moved at a heading of zero degrees at one meter per second (vector 506). The programmer-specified vectors for loads B and C may be selected as initial desired vectors 504, 506. Because no vector was specified for load A however, a normal or default plan of load movement associated with the particular load transportation system may be determined.

Where system 500 includes a matrix of roller diverter actuators (not shown), for example, movement may only be permitted in the directions of headings zero, forty-five, and one hundred and thirty-five degrees. Typical and/or desired movement may therefore, consist of moving a load at a heading of zero degrees until it is aligned at either a forty-five degree or one hundred and thirty-five degree angle with the intended destination (e.g., location A'), then by moving in the requisite diagonally-aligned direction to reach the destination. Because the desired destination location A' is oriented at a heading of zero degrees from the current position of load A, a default path of zero degrees may, for example, be chosen for load A. The velocity of load A may, according to some embodiments, be set to a default velocity, such as one meter per second. In such a manner, the initial desired vector 502 for load A may be determined.

In some embodiments, the vectors 502, 504, 506 may be compared with the capabilities of the actuators to determine if the vectors 502, 504, 506 are obtainable by system 500. For example, the roller diverter actuators may be capable of achieving velocities between zero and two meters per second, in one meter per second increments, at headings as described above. Because the desired vector 502 for load A was selected based on system 500 defaults and/or capabilities, the vector 502 conforms to actuator capabilities (e.g., one meter per second at a heading of zero degrees is obtainable). The vector 506 for load C is, in this illustrative example, equivalent to the vector 502 selected for load A, and is therefore also obtainable.

The desired vector 504 for load B however, includes both headings and velocities that are not obtainable. In other words, the actuators are not capable of obtaining the fractional velocity of one and a half meters per second, and they are not capable of movement at a heading of forty degrees. In some embodiments, the desired vector 504 for load B may be converted to an obtainable vector 508. The obtainable vector 508 may be, for example, set to both headings and velocities that are substantially similar and/or as similar as possible to those originally specified by the programmer. For example, the obtainable vector 508 for load B may be set to a velocity of two meters per second (or one meter per second if rounding down is desired) and the heading may be set at forty-five degrees. Any method of rounding, converting, and/or altering the desired velocity and heading to obtainable velocities and headings that is or becomes known or available may be used.

In some embodiments, the possibility of collision may be investigated. Predicting the locations of loads A, B, and C over time, for example, it may be determined that loads A and B are likely to collide. In some embodiments, the velocity of load B may be adjusted to avoid the collision. For example, the conversion of the original desired velocity for load B into an obtainable velocity for load B may be revisited. The conversion may be recalculated, for example, to round the original desired velocity of load B down instead of up. The resulting obtainable velocity of one meter per second may therefore be selected. If analysis of predicted future load positions using the new setting shows that the collision has been avoided by the change, no further changes may be required. If the collision remains likely however, either or both of the obtainable vectors 502, 508 for loads A and B may be appropriately adjusted to avoid the collision. In some embodiments, only imminent collisions (e.g., collisions likely to occur within one machine cycle and/or within a small amount of time) may be considered. This may, for example, allow the loads to be transported as similarly to the desired behaviors as is possible and/or reduce computation time.

Figure 6:
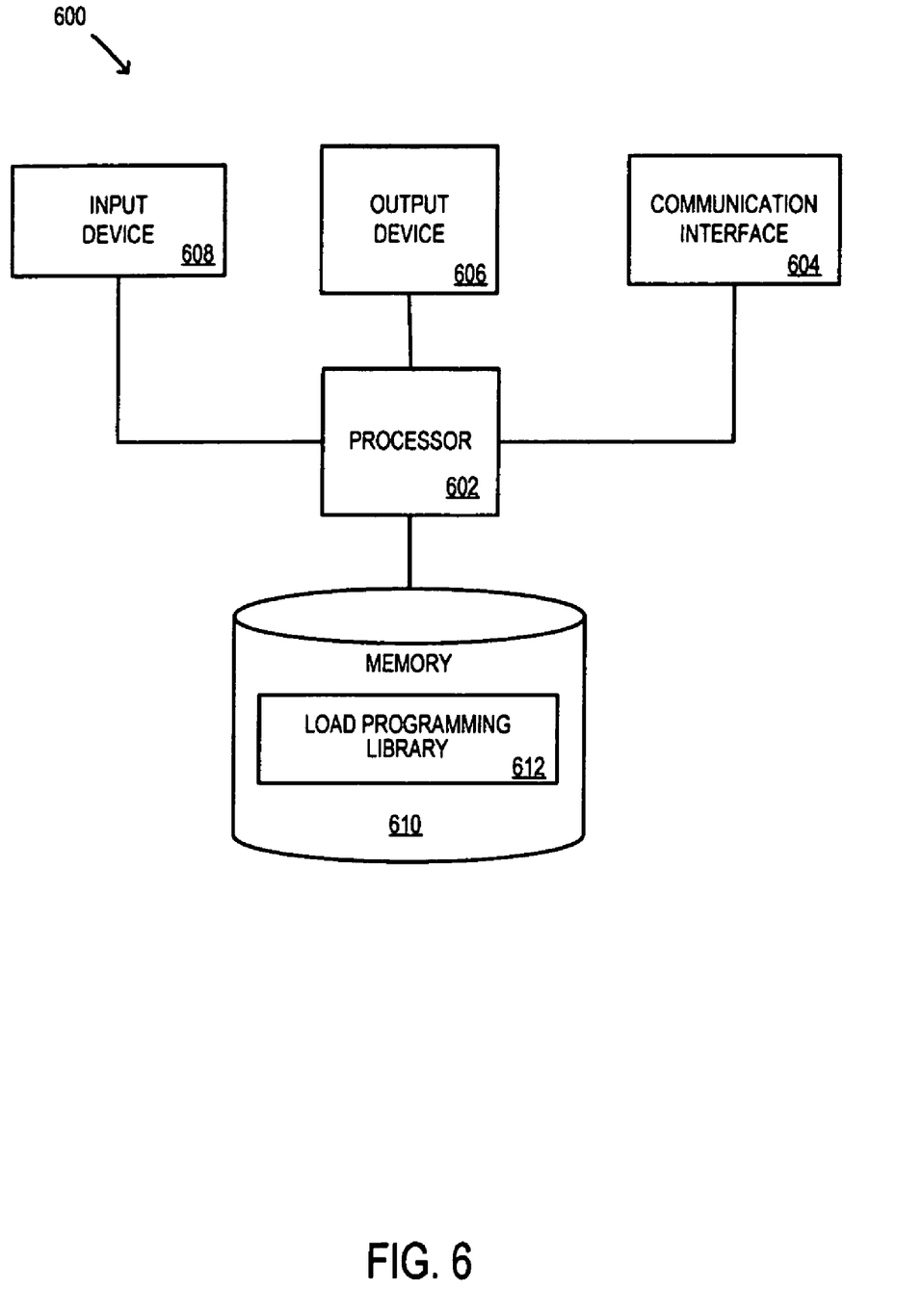
FIG. 6 is a block diagram of a system according to some embodiments.

Turning now to FIG. 6, a block diagram of a system 600 for programming load motion according to some embodiments is depicted for use in explanation, but not limitation, of described embodiments. Different types, layouts, quantities, and configurations of systems may be used without deviating from the scope or intent of some embodiments. In some embodiments, the system 600 may be or include a computer such as a computer server, computer workstation, PC, and/or any other type or configuration of computational or logic device. The server 600 may include one or more processors 602, which may be any type or configuration of processor, microprocessors, and/or micro-engines that is or becomes known or available. In some embodiments, the server 600 may also include one or more communication interfaces 604, an output device 606, an input device 608, and/or a memory device 610, all and/or any of which may be in communication with the processor 602.

The communication interface 604 may be or include any type and/or configuration of communication device that is or becomes known or available. In some embodiments, the communication device 604 may allow the system 600 (and/or the processor 602) to communicate with, for example, a load transportation system such as systems 100, 150, 300 and/or with a matrix of actuators such as the matrix 104*a*-*b*, 154*a*-*c* described herein. In some embodiments, the processor 602 may send signals to the matrix of actuators and/or any of the various individual actuators. The signal may be, for example, the control signal as described in conjunction with method 200 herein. The output device 606 and the input device 608 may be or include one or more conventional devices such as displays, printers, keyboards, a mouse, a trackball, etc. The devices 606, 608 may be utilized, for example, by an operator and/or system user to program a load transportation system in accordance with embodiments described herein.

The memory device 610 may be or include, according to some embodiments, one or more magnetic storage devices, such as hard disks, one or more optical storage devices, and/or solid state storage. The memory device 610 may store, for example, applications, programs, procedures, and/or modules 612, by which the server 600 may allow programming of load actuators. The load programming library 612, for example, may be a program and/or API for facilitating and/or standardizing the programming of load motion actuators. The load programming library 612 may be or be similar to, according to some embodiments, the load programming library 304 described in conjunction with FIG. 3 herein. For example, the load programming library 612 may permit a programmer to enter desired load behaviors to control load motions. The load programming library 612 may, for example, convert desired load behaviors into appropriate actuator commands and/or actions for moving loads as desired.

The several embodiments described herein are solely for the purpose of illustration. Persons skilled in the art will recognize from this description that other embodiments may be practiced with modifications and alterations limited only by the claims.

What is claimed is:

1. A method, for moving one or more loads using a plurality of load actuators coupled to a processor programmable with actuator commands to manipulate said plurality of load actuators so as to result in said plurality of load actuators actuating a behavior of said one or more loads, said method comprising the steps of:

receiving commands specifying a desired behavior of the one or more loads, the commands based on a received input of a desired velocity to move the one or more loads;

determining that the desired velocity is not obtainable;

in response to determining that the desired velocity is not obtainable, determining, using stored and/or entered capabilities information of said system and/or said plurality of load actuators, actuator commands that result in an obtainable behavior of the one or more loads based on a capability of the plurality of load actuators, and an acceleration limit associated with the one or more loads, wherein a velocity of the obtainable behavior is different than a velocity of the desired behavior; and moving the one or more loads at the velocity associated with the obtainable behavior.

2. The method of claim 1, further comprising the step of: determining a current behavior of the one or more loads.

3. The method of claim 2, wherein the determined actuator commands are determined at least in part based on the current behavior of the one or more loads.

4. The method of claim 2, wherein the step of determining the current behavior of the one or more loads comprises:
predicting a future position of the one or more loads based on the determined actuator commands applied to the one or more load actuators.

5. The method of claim 2, the step of determining the current behavior of the one or more loads comprises:
determining a nearest neighboring load of the one or more loads.

6. The method of claim 2, the determining the current behavior of the one or more loads comprises:
determining a distance between the one or more loads and at least one other load.

7. The method of claim 1, further comprising the step of: determining when the desired behavior is not substantially similar to any obtainable behavior and then adjusting the desired behavior toward said obtainable behavior prior to applying determined actuator commands to said plurality of load actuators.

8. The method of claim 7, further comprising the steps of: determining current information associated with the current behavior and/or limits of the one or more loads;
determining a behavior profile associated with the one or more loads using the current information; and
adjusting the obtainable behavior toward said behavior profile associated with the one or more loads when a difference between the obtainable behavior and the current behavior exceeds a threshold.

9. The method of claim 1, wherein said desired behavior comprises a desired velocity.

10. The method of claim 1, wherein said desired behavior comprises:
a desired position.

11. The method of claim 1, wherein the one or more loads comprise a plurality of loads and said step of determining comprises:
determining at least one of a desired position and a desired velocity for at least one of the plurality of loads;
determining, for each other load of the plurality of loads, at least one of a desired position and a desired velocity, wherein the at least one of a desired position and a desired velocity of each load is relative to another load in the plurality of loads; and
determining a velocity for the one or more load actuators that substantially causes each load in the plurality of loads to achieve the at least one of the desired position and the desired velocity.

12. The method of claim 1, wherein the one or more loads comprise a plurality of loads and said step of determining comprises:
grouping at least two of the plurality of loads into one or more virtual collections;
determining at least one of a desired position and a desired velocity for the at least two loads in the one or more virtual collections; and
determining a velocity for the one or more load actuators that substantially causes the at least two loads in the one or more virtual collections to achieve the at least one of the desired position and the desired velocity.

13. The method of claim 12, wherein the grouping comprises:
partitioning the loads in the plurality of loads into groups based at least in part on the geometric positions of the loads.

14. The method of claim 13, wherein the partitioning comprises:
selecting a load in the plurality of loads having the most extreme geometric position.

15. The method of claim 8, further comprising the steps of: determining if the one or more loads will collide with at least one other load; and
determining said actuator commands that result in the obtainable behavior of the one or more loads that is close to achieving the desired behavior while avoiding a collision between the one or more loads.

16. The method of claim 1, wherein the one or more load actuators includes a matrix of load actuators.

* * * * *